United States Patent
Raphaeli et al.

(10) Patent No.: US 10,754,008 B2
(45) Date of Patent: Aug. 25, 2020

(54) VEHICLE RADAR SYSTEM THAT ADDRESSES DOPPLER FREQUENCY SHIFT AND METHOD OF USING THE SAME

(71) Applicants: GM GLOBAL TECHNOLOGY OPERATIONS LLC, Detroit, MI (US); Silantrix Ltd., Kfar Saba (IL)

(72) Inventors: Dani Raphaeli, Kfar Saba (IL); Oded Bialer, Herzliya (IL); Igal Bilik, Herzliya (IL)

(73) Assignees: GM GLOBAL TECHNOLOGY OPERATIONS LLC, Detroit, MI (US); SILANTRIX LTD., Kfar Saba (IL)

( * ) Notice: Subject to any disclaimer, the term of this patent is extended or adjusted under 35 U.S.C. 154(b) by 276 days.

(21) Appl. No.: 15/897,333

(22) Filed: Feb. 15, 2018

(65) Prior Publication Data

US 2019/0250249 A1  Aug. 15, 2019

(51) Int. Cl.

| G01S 7/41 | (2006.01) |
| G01S 13/931 | (2020.01) |
| G01S 7/295 | (2006.01) |
| G01S 13/60 | (2006.01) |
| G01S 13/58 | (2006.01) |
| G01S 13/28 | (2006.01) |
| G01S 13/42 | (2006.01) |
| G01S 13/90 | (2006.01) |

(52) U.S. Cl.
CPC .............. *G01S 7/415* (2013.01); *G01S 7/295* (2013.01); *G01S 13/284* (2013.01); *G01S 13/42* (2013.01); *G01S 13/581* (2013.01); *G01S 13/582* (2013.01); *G01S 13/60* (2013.01); *G01S 13/931* (2013.01); *G01S 13/9047* (2019.05)

(58) Field of Classification Search
CPC combination set(s) only.
See application file for complete search history.

(56) References Cited

U.S. PATENT DOCUMENTS

| 5,493,269 A * | 2/1996 | Durley ..................... B60Q 1/50 |
| | | 180/167 |
| 6,369,747 B1 * | 4/2002 | Ashihara ............... G01S 7/4004 |
| | | 342/165 |
| 9,733,350 B2 | 8/2017 | Stainvas Olshansky et al. |
| 2014/0015708 A1 | 1/2014 | Bilik |

(Continued)

*Primary Examiner* — Mamadou L Diallo
(74) *Attorney, Agent, or Firm* — Reising Ethington, P.C.

(57) ABSTRACT

A vehicle radar system, such as a multiple input multiple output (MIMO) radar system, for estimating a Doppler frequency shift and a method of using the same. In one example, a modulated signal is mixed with an orthogonal code sequence and is transmitted by a transmit antenna array with a plurality of transmitting antennas. The signals reflect off of a target object and are received by a receive antenna array with a plurality of receiving antennas. Each of the received signals, which likely includes a Doppler frequency shift, is processed and mixed with a number of frequency shift hypotheses that are intended to offset the Doppler frequency shift and result in a series of correlation values. The frequency shift hypothesis with the highest correlation value is selected and used to correct for the Doppler frequency shift so that more accurate target object parameters, such as velocity, can be obtained.

20 Claims, 3 Drawing Sheets

(56) References Cited

U.S. PATENT DOCUMENTS

| | | |
|---|---|---|
| 2014/0218227 A1* | 8/2014 | Stelzen .................. G01S 7/415 342/104 |
| 2016/0061935 A1* | 3/2016 | McCloskey ............. G01S 7/023 342/82 |
| 2017/0261602 A1 | 9/2017 | Olshansky et al. |
| 2017/0307733 A1 | 10/2017 | Stainvas Olshansky et al. |
| 2018/0172814 A1* | 6/2018 | Okazaki ................ G01S 13/524 |
| 2019/0128998 A1* | 5/2019 | Josefsberg .............. G01S 7/032 |
| 2019/0163198 A1* | 5/2019 | Niesen ................... G01S 13/60 |
| 2019/0195998 A1* | 6/2019 | Campbell ............... G01S 13/42 |
| 2019/0227164 A1* | 7/2019 | Wantenaar ............ G01S 7/4021 |

* cited by examiner

VEHICLE RADAR SYSTEM THAT ADDRESSES DOPPLER FREQUENCY SHIFT AND METHOD OF USING THE SAME

TECHNICAL FIELD

The present invention relates generally to radar systems, and more particularly, to vehicle radar systems and methods that can overcome angular resolution degradation due to Doppler frequency shifts.

BACKGROUND

Many modern vehicles are equipped with advanced safety and driver-assist systems that require robust and precise object detection and tracking systems to control host vehicle maneuvers. These systems utilize periodic or continuous detection of objects and control algorithms to estimate various object parameters, such as the relative object range, velocity, direction of travel, and size. For example, radar devices detect and locate objects (i.e., targets), by transmitting electromagnetic signals that reflect off targets within a sensor's field-of-view. The reflected signal returns to the radar as echoes where they are processed to determine various information such as the round-trip travel time of the transmitted/received signals. However, when multiple targets are present, certain radar devices lack the angular and/or spatial resolution necessary to distinguish between multiple targets that are closely-located. In these cases, wherein multiple located targets are so closely located that they cannot be separated by range or angle, the targets may still be separated by a Doppler frequency if the Doppler resolution of the radar device is sufficiently high.

The Doppler effect manifests itself when there is a relative range rate, or radial velocity, between the host vehicle with the radar and the target. When the radar's transmit signal is reflected from such a target, the carrier frequency of the return signal will be shifted. Assuming a co-located transmitter and receiver, the resulting Doppler frequency shift is a function of the carrier wavelength and the relative radial velocity (range rate) between the radar and the target. When the target is moving away from the radar, the relative radial velocity, or range rate, is defined to be positive and results in a negative Doppler shift; when the target is moving towards the radar, the opposite occurs.

Advanced radar systems in use today may utilize a multiple-input multiple-output (MIMO) concept that employs multiple antennas at the transmitter to transmit independent waveforms and multiple antennas at the receiver to receive the radar echoes. In a "co-located" MIMO radar configuration, the antennas in both the transmitter and the receiver are spaced sufficiently close so that each antenna views the same aspect of an object such that a point target is assumed. In the MIMO receiver, a matched filter bank is used to extract the waveform components. When the signals are transmitted from different antennas, the echoes of each signal carry independent information about detected objects and the different propagation paths. Phase differences caused by different transmitting antennas along with phase differences caused by different receiving antennas mathematically form a virtual antenna array that provides for a larger virtual aperture using fewer antenna elements. Conceptually, the virtual array is created by interleaving between each of the transmitter Tx and receiver Rx antenna elements such that the elements in the virtual array represent Tx-Rx pairs for each of the transmitter Tx and receiver Rx antennas in the MIMO array. For co-located MIMO antennas, a transmit array having N transmitter antennas and a receive array having M receive antennas produces a virtual array having M×N virtual receiver elements. In other words, the waveforms are extracted by the matched filters at the receiver such that there are a total of M×N extracted signals in the virtual array.

In addition to generating and transmitting individual waveforms from each transmitter antenna, the transmitted signals may be encoded using various coding techniques. For example, each transmitter antenna may be configured to transmit a waveform with a different code. Thus, a transmit array will transmit N spatial codes that span the entire radar field-of-view, which generally ranges from 120° (+/−60° from boresight) to 180° (+/−90° boresight). The codes are transmitted over each of the N transmit antennas as a sequence of symbols. Because the received signal vector is a sum of the echo signals transmitted from all of the N transmit antennas, to achieve separation of the N transmission channels at the receiver, the number of symbols in a sequence (i.e., the number of transmitted codes) must be equal to the number of transmit antennas, N. Consequently, as the number of transmit antennas increases, so does the length of the codes and the repetition interval of each sequence. However, as the repetition interval increases, ambiguity arises with respect to velocity estimation (i.e., Doppler frequency).

SUMMARY

According to one aspect, there is provided a method of using a vehicle radar system to estimate a Doppler frequency shift. The vehicle radar system comprises a transmit antenna array having a plurality of transmitting antennas and a receive antenna array having a plurality of receiving antennas. The method comprises the steps of: receiving a modulated signal $MS_1$ from a transmitter; mixing the modulated signal $MS_1$ with a code sequence $C_1$-$C_N$ to produce a plurality of encoded transmit signals $Tx_1$-$Tx_N$, the code sequence $C_1$-$C_N$ includes at least one separate code for each of the plurality of transmitting antennas in the transmit antenna array; transmitting the plurality of encoded transmit signals $Tx_1$-$T_N$ with the transmit antenna array; receiving a plurality of receive signals $Rx_1$-$Rx_M$ with the receive antenna array, the plurality of receive signals $Rx_1$-$Rx_M$ include at least one receive signal for each of the plurality of receiving antennas in the receive antenna array; de-mixing the plurality of receive signals $Rx_1$-$Rx_M$ with the code sequence $C_1$-$C_N$ to produce a plurality of decoded offset signals $D_{1,1}$-$D_{M,N}$, the plurality of decoded offset signals $D_{1,1}$-$D_{M,N}$ include at least N number of decoded offset signals for each of the plurality of receive signals $Rx_1$-$Rx_M$; applying a plurality of frequency shift hypotheses $\omega_1$-$\omega_L$ to the plurality of decoded offset signals $D_{1,1}$-$D_{M,N}$ to obtain a plurality of decoded hypothesis signals $F_{1,1,1}$-$F_{M,N,L}$, the plurality of decoded hypothesis signals $F_{1,1,1}$-$F_{M,N,L}$ include at least L number of decoded hypothesis signals for each of the plurality of decoded offset signals $D_{1,1}$-$D_{M,N}$; evaluating the plurality of decoded hypothesis signals $F_{1,1,1}$-$F_{M,N,L}$ to determine which frequency shift hypotheses $\omega_1$-$\omega_L$ most accurately represents the Doppler frequency shift; and selecting one of the plurality of frequency shift hypotheses $\omega_1$-$\omega_L$ to address the Doppler frequency shift, wherein the selection of a frequency shift hypothesis is based on the evaluation.

According to another aspect, there is provided a vehicle radar system for estimating a Doppler frequency shift, the vehicle radar system is mounted on a host vehicle and comprises: a transmitter with one or more mixers, the transmitter is configured to provide a plurality of encoded transmit signals $Tx_1$-$Tx_N$ that include a modulated signal $MS_1$ mixed with a code sequence $C_1$-$C_N$; a transmit antenna array with a plurality of transmitting antennas coupled to the transmitter, the transmit antenna array is configured to receive the plurality of encoded transmit signals $Tx_1$-$Tx_N$ from the transmitter such that the code sequence $C_1$-$C_N$ includes at least one separate code for each of the plurality of transmitting antennas; a receive antenna array with a plurality of receiving antennas, the receive antenna array is configured to provide a plurality of receive signals $Rx_1$-$Rx_M$; and a receiver with one or more de-mixers coupled to the receive antenna array. The receiver is configured to: de-mix the plurality of receive signals $Rx_1$-$Rx_M$ with the code sequence $C_1$-$C_N$ to produce a plurality of decoded offset signals $D_{1,1}$-$D_{M,N}$, the plurality of decoded offset signals $D_{1,1}$-$D_{M,N}$ include at least N number of decoded offset signals for each of the plurality of receive signals $Rx_1$-$Rx_M$; apply a plurality of frequency shift hypotheses $\omega_1$-$\omega_L$ to the plurality of decoded offset signals $D_{1,1}$-$D_{M,N}$ to obtain a plurality of decoded hypothesis signals $F_{1,1,1}$-$F_{M,N,L}$, the plurality of decoded hypothesis signals $F_{1,1,1}$-$F_{M,N,L}$ include at least L number of decoded hypothesis signals for each of the plurality of decoded offset signals $D_{1,1}$-$D_{M,N}$; evaluate the plurality of decoded hypothesis signals $F_{1,1,1}$-$F_{M,N,L}$ to determine which frequency shift hypotheses $\omega_1$-$\omega_L$ most accurately represents the Doppler frequency shift; and select one of the plurality of frequency shift hypotheses $\omega_1$-$\omega_L$ to address the Doppler frequency shift, wherein the selection of a frequency shift hypothesis is based on the evaluation.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
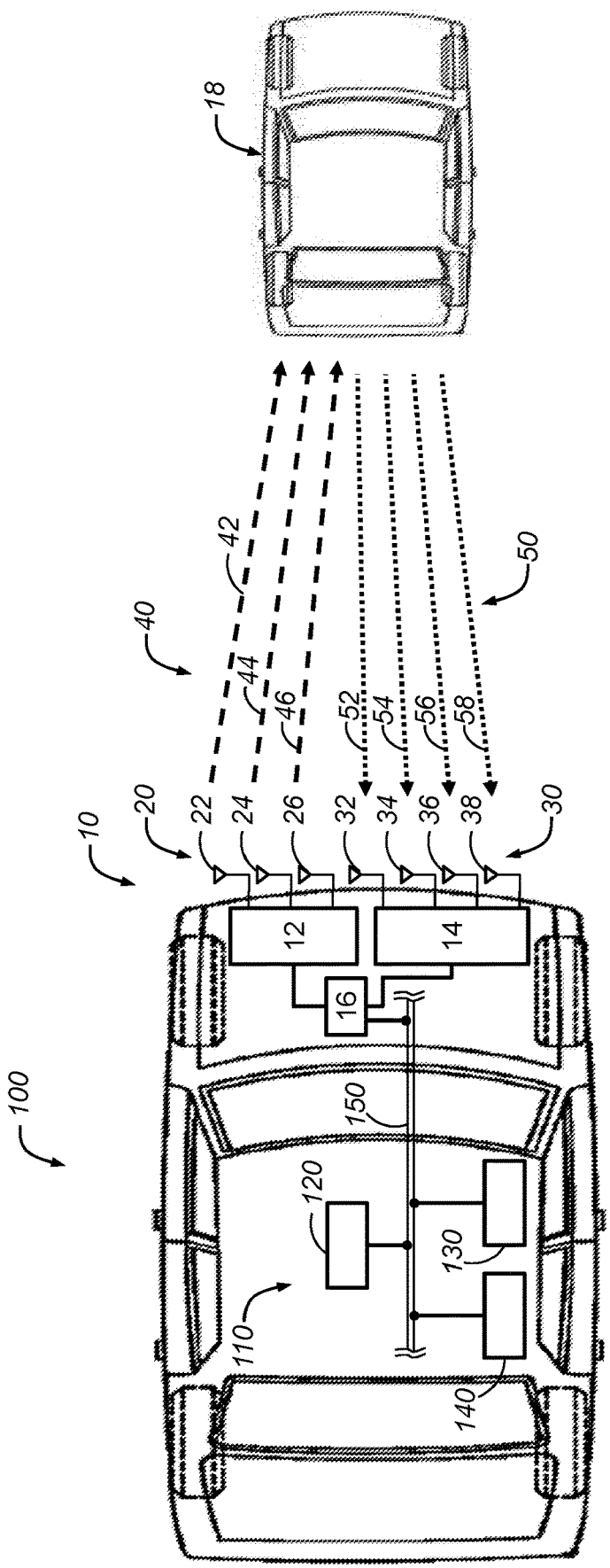
FIG. 1 is a schematic block diagram of a host vehicle and a target object, where the host vehicle includes an example of a vehicle radar system.

The vehicle radar system and method described herein enable a host vehicle equipped with the system to estimate various parameters of a target object with improved accuracy. The vehicle radar system may be a multiple input multiple output (MIMO) radar system that includes multiple transmitting antennas and multiple receiving antennas. In one example, a modulated signal is mixed with a different code (e.g., an orthogonal code) for each transmitting antenna such that each transmitting antenna is associated with a particular code. Each of the transmitting antennas then sends an encoded transmit signal (i.e., a signal containing the modulated signal that is mixed with the particular code). A reflected signal or echo reflects off of the target object and is received at each of the receiving antennas in the form of receive signals. Each of the receive signals (i.e., a signal containing the modulated signal mixed with the particular code and potentially altered due to a Doppler frequency shift) is then processed with a plurality of frequency shift hypotheses which results in a plurality of correlation scores. The highest correlation score is selected and the frequency shift hypothesis associated with the selected correlation score is then used to better estimate or approximate the Doppler frequency shift, which in turn can be used to better calculate certain parameters of the target object, such as its relative velocity with respect to the host vehicle. The following description is provided in the context of improving calculations regarding the relative velocity of one or more target vehicles, but it should be understood that the vehicle radar system and method of the present application is not so limited and may be used to improve calculations regarding other target object parameters as well, including the relative range and angle of the target object with respect to the host vehicle.

According to one embodiment, the modulated signal is encoded with different codes so as to achieve no or minimal interference between the different transmitted signals. The codes may be orthogonal codes, such as Gold codes and/or other codes that result in transmitted signals that are non-coherent. The relative velocity between the host vehicle with the vehicle radar system and the target object causes a Doppler frequency shift. This Doppler frequency shift can have a negative effect on orthogonally-coded (or orthogonally-mixed) transmissions when, for example, the transmissions are modulated using an orthogonal code sequence and transmitted in short pulses or "chirps." In such a case, the transmitted and/or received signals may interfere with one another thereby causing the original orthogonality between the transmitted signals to be lost. When the orthogonality is lost, separating the different channels at the receiver becomes more difficult.

In one embodiment, the vehicle radar system discussed herein is incorporated into a vehicle electronics system for use with autonomous and/or semi-autonomous vehicle operations. The vehicle radar system can be used to gather velocity information regarding one or more target objects, as well as other target object parameters and information. As mentioned above, the velocity of the target object can be determined based on the Doppler frequency shift. However, when the relative velocity is high between the host vehicle and the target object, significant Doppler frequency shifts can cause substantial Doppler ambiguity, thereby resulting in inaccurate target velocity estimations. To address the Doppler frequency shift, each of the received signals can be de-mixed or decoded with the different codes to obtain decoded offset signals, which have been initially decoded but may still include a Doppler frequency shift component. Each of the decoded offset signals can then be mixed with a series of frequency shift hypotheses to obtain a series of decoded hypothesis signals. For the decoded hypothesis signals, a score can be calculated that determines the correlation between the decoded hypothesis signals and the corresponding encoded transmit signals. The higher the correlation (or similarity) between these signals (or between the original code sequence and the decoded code sequence), the more likely the corresponding frequency shift hypothesis represents the actual Doppler frequency shift. Thus, the frequency shift hypothesis associated with the decoded hypothesis signals having the highest score can then be used to better determine the velocity of the target object and/or some other target object parameter such as target object range and angle information.

The vehicle radar system and method described below are directed to a multiple-input multiple-output (MIMO) radar system and a method for using joint codeword decoding and Doppler frequency shift hypotheses. FIG. 1 illustrates one possible architecture for a MIMO vehicle radar system 10 that can be used to implement the disclosed method. While the approach and methodology described herein relate to the radar configuration shown in FIGS. 1 and 2, one of ordinary skill in the art will appreciate that vehicle radar system 10 is merely one example, and in many ways, the schematic block diagrams of these figures have been simplified for ease of explanation. Other configurations and embodiments may certainly be used instead, as the vehicle radar system and method described herein represent just one possible example.

The vehicle radar system 10 may be a MIMO system that includes a transmitter 12 communicatively coupled to a transmit antenna array 20 having N transmit antennas 22-26 configured to create a sensor field-of-view that monitors a particular zone of interest. The transmit antenna array 20 is configured to transmit electromagnetic signals (i.e., encoded transmit signals) 42-46 that reflect off one or more target objects 18 within the field-of-view of the vehicle radar system 10. According to the non-limiting example shown in FIGS. 1 and 2, the transmit antenna array 20 is mounted on the front of the host vehicle, includes three transmit antennas 22-26, and is configured to transmit radar signals in a direction generally parallel to the longitudinal axis of the host vehicle. However, this is only one possibility. For instance, the transmit antenna array 20 could be mounted at a location other than on the front of the host vehicle, it may include more or less than three transmit antennas, and it could be oriented in a different direction.

The transmitter 12 may be a stand-alone module or unit; it may be part of a larger module, unit, system, etc.; it may include a number of sub-modules, sub-units, sub-systems, etc.; or it may be configured according to some other arrangement or architecture so long as it is configured to generate electromagnetic signals for transmission over the transmit antenna array 20 in accordance with the method disclosed herein. In one non-limiting example, the transmitter 12 includes a baseband processor that is configured to manage radio operations, including the generation of signals for transmission using the antenna array 20. The baseband processor can include known hardware, firmware and/or software typically found on such transmitters, including random access memory (RAM, including static RAM (SRAM) and dynamic RAM (DRAM)) or other types of memory, including flash memory, other solid state memory, or other suitable memory. In other embodiments, the baseband processor of the transmitter 12 is included in a radar control module 16. The transmitter 12 can include waveform generators, oscillators, amplifiers, mixers, combiners, filters, converters and/or processors, to name just a few possible components. By way of example only, a waveform generator 28 may be configured to generate waveforms or signals having different pulse widths, different waveform types and/or different pulse repetition intervals (PRI) within a given coherent processing interval (CPI). The waveforms or signals may then be digitized by a digital to analog (D/A) converter and up converted to a radio frequency carrier using an up converter. The up converter can consist of intermediate frequency (IF) and/or radio frequency (RF) oscillators, filters and/or synchronizing circuits. A transmit amplifier may then generate a transmit signal, which can be fed to a circulator or similar device. Again, this is only one possible configuration for transmitter 12, as numerous other configurations certainly are possible.

Reflected signals 52-58 reflect off the target object 18 and are received as echoes by a receive antenna array 30 having M receive antennas 32-38. According to this non-limiting example, there are three transmit antennas 22-26 (N=3) and four receive antennas 32-38 (M=4). This results in a virtual antenna array having M×N virtual receiver elements (M×N=12 in the illustrated example). The transmit antennas 22-26 and the receive antennas 32-38 can be designed or configured to transmit or receive signals of a particular frequency or frequency range. As mentioned above in conjunction with the transmit antenna array, although the receive antenna array 30 is illustrated in the drawings as being a four antenna array mounted on the front of the host vehicle and pointed in the vehicle forward direction, this is not necessary. The receive antenna array 30 may be mounted on other portions of the vehicle, it may be oriented in other directions, and it may have more or less antenna elements than four, to cite a few possibilities.

The receiver 14 is configured to process and extract information from the reflected signals or echoes that relates to the target object 18 such as, for example, its range, azimuth angle, and range rate or velocity. When the reflected signals reflect or bounce off of a target object 18 that has a relative velocity, with respect to the host vehicle, the reflected signals will include a Doppler frequency shift component. The receiver 14 may be a stand-alone module or unit; it may be part of a larger module, unit, system, etc. (e.g., one that also includes transmitter 12); it may include a number of sub-modules, sub-units, sub-systems, etc.; or it may be configured according to some other arrangement or architecture so long as it is configured to process electromagnetic signals received by the receive antenna array 30 in accordance with the method disclosed herein. According to a non-limiting example, the receiver 14 includes known hardware, firmware and/or or software typically found on receivers such as, without limitation, amplifiers, mixers, de-mixers, oscillators, combiners, filters, and converters. The functions performed by receiver 14 may vary, but generally include performing various filtering, amplification, conversion and digitizing functions, as well as signal processing functions like analyzing various properties of the signals and waveforms to determine information such as phase, frequency, and amplitude. As understood by those skilled in the art, the techniques used to extract this information from the signals and waveforms can vary, but may include without limitation, in-phase and quadrature analysis and frequency domain analysis using Fourier transforms. In one embodiment, the receiver 14 may also include, components to perform pulse compression and clutter rejection (e.g., Doppler filtering) functions. In one embodiment, the receiver 14 includes a combination of radio receiver circuitry that is configured to carry out the signal processing functionality described herein, such as that shown in FIG. 2.

In one embodiment, the receiver 14 may include a baseband processor, such as the one discussed above with respect to transmitter 12. And, in some embodiments, the transmitter 12 and the receiver 14 can share a common baseband processor, such as one that is included as a part of the radar control module 16. For example, all or certain portions of the receiver 14 can be integrated into the radar control module 16, along with all or certain portions of the transmitter 12. The radar control module 16 can include a radio chipset that includes an integrated circuit and that is connected to or includes a processor and memory. The radar control module 16 can also include certain components or circuitry configured to interface the radio chipset and circuitry with a vehicle communication system so that the vehicle radar system 10 can communicate with other components, modules and/or systems located throughout the host vehicle and beyond. For example, it is possible for the vehicle radar system 10 to be part of the host vehicle's electronics so that the vehicle radar system can communicate with other vehicle system modules 140 over a central vehicle communication bus 150.

In one particular embodiment, the radar system 10 may implemented on a host vehicle 100, wherein the transmitter 12, the receiver 14, and/or the radar control module 16 may be implemented as a vehicle control module. The control module may include any variety of electronic processing devices, memory devices, input/output (110) devices, and/or other known components, and may perform various control and/or communication related functions. Depending on the particular embodiment, control module may be a stand-alone vehicle electronic module, it may be incorporated or included within another vehicle electronic module (e.g., a steering control module, brake control module, etc.), or it may be part of a larger network or system (e.g., autonomous driving system, a traction control system (TCS), electronic stability control (ESC) system, antilock brake system (ABS), driver assistance system, adaptive cruise control system, lane departure warning system, etc.), to name a few possibilities. Such a control module is not limited to any one particular embodiment or arrangement.

Additionally, the vehicle electronics system 110 can include various vehicle modules, including engine control unit (ECU) 120, an onboard computer 130, and other VSMs 140. The ECU 120 can be used to control various aspects of engine operation such as fuel ignition and ignition timing. The ECU 120 is connected to communications bus 150 and may receive operation instructions from a body control module (BCM) (not shown) or other VSMs, including onboard computer 30. The ECU 120 may control an internal combustion engine (ICE) and/or electric propulsion motors (or other primary mover(s)).

Figure 3:
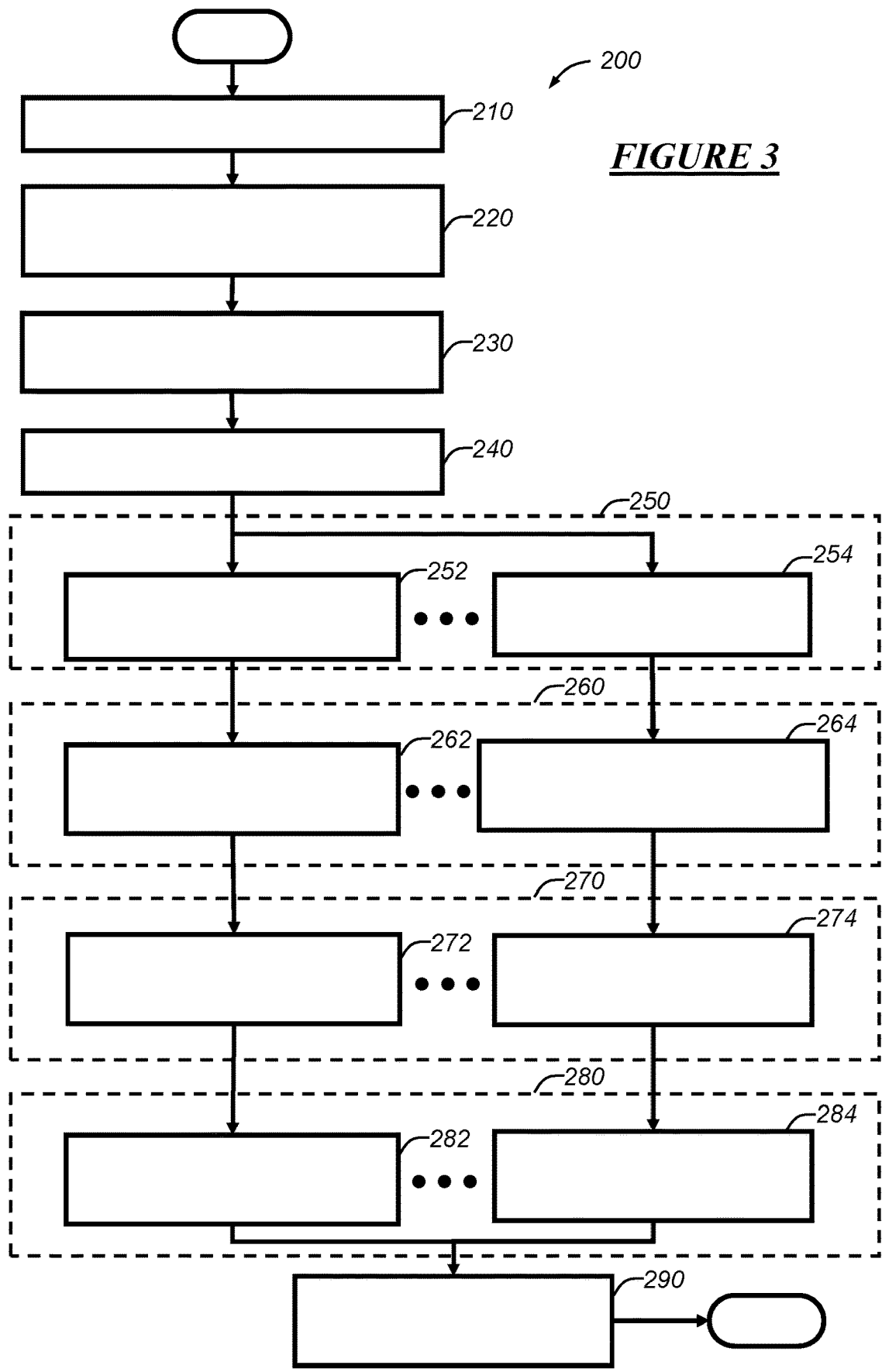
FIG. 3 is a flow chart depicting an example of a method for using a vehicle radar system, such as the one shown in FIG. 2, to obtain radar information concerning one or more target object(s).

Onboard computer 130 is a vehicle system module that includes a processor and memory. Additionally, at least in some embodiments, onboard computer 30 can be an infotainment unit (e.g., infotainment head unit, in-car entertainment (ICE) unit, in-vehicle infotainment (IVI)), a vehicle head unit, a center stack module (CSM), or vehicle navigation module. In some embodiments, onboard computer 30 may include one or more vehicle-user interfaces including pushbutton 52 and/or microphone 56, as discussed more below. The processor can be used to execute various types of digitally-stored instructions, such as software or firmware programs stored in memory, which enable the computer 130 to provide a wide variety of services. In one embodiment, the processor can execute programs or process data to carry out at least a part of the method discussed herein. For example, the processor can receive signals or data from various vehicle system modules (e.g., VSM 140), including sensor data. In a particular embodiment, the onboard computer 130 can determine when to initiate the method 200 (discussed below in FIG. 3). For example, the onboard computer 130 can receive sensor data from a vehicle sensor (e.g., a camera, radar, lidar, or other sensor installed on the vehicle) and, based on the received sensor data, it can be determined that velocity information (and/or other information, including spatial information) is desired regarding a target object 18. Such information may be desirable when, for example, the vehicle is carrying out autonomous and/or semi-autonomous operations. In response to determining that more information, such as velocity information, is desirable regarding a target object, the vehicle can then begin method 200 (FIG. 3).

As mentioned, at least in some embodiments, the radar control module 16 includes a processor and memory and, in some embodiments, transmitter 12 and/or receiver 14 can include a processor and memory. The processor can be any type of device capable of processing electronic instructions including microprocessors, microcontrollers, host processors, controllers, vehicle communication processors, and application specific integrated circuits (ASICs). The memory may include RAM, other temporary powered memory, any non-transitory computer-readable medium (e.g., EEPROM), or any other electronic computer medium that stores some or all of the software needed to carry out the various radio and/or signal processing functions discussed herein.

Figure 2:
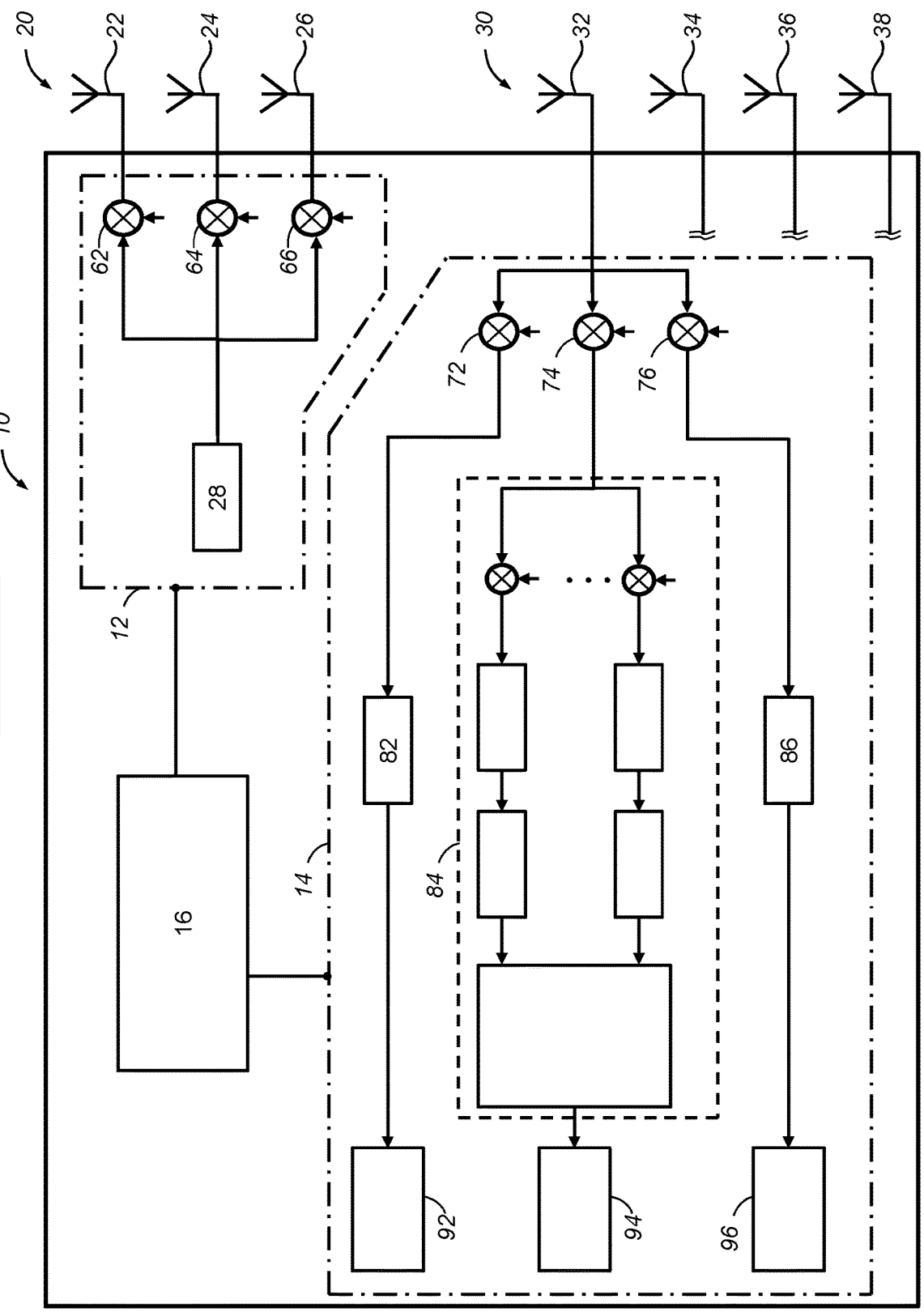
FIG. 2 is a more detailed schematic block diagram of an example of a vehicle radar system, such as the one shown in FIG. 1.

FIG. 2 is a schematic illustration of certain components and/or processes that can be used or implemented by vehicle radar system 10. Transmitter 12 may include a waveform generator 28 that generates a modulated signal $MS_1$ that is a modulated signal or waveform with a certain bandwidth around a high carrier frequency. The modulated signal $MS_1$ is then mixed using frequency mixers 62-66 with three different codes $C_1$ to $C_3$, one for each transmitting antenna 22-26. Since the transmit antenna array 20 will transmit multiple signals simultaneously in the same frequency range and the receive antenna array 30 will receive the summation of these simultaneous transmissions, the codes are used to minimize interference and to separate the received signals at the receiver 14. As a result of mixing the modulated signal $MS_1$ with the codes $C_1$ to $C_3$, three encoded transmit signals $Tx_1$, $Tx_2$, and $Tx_3$ can then be transmitted or sent using transmitting antennas 22-26.

The encoded transmit signals $Tx_1$, $Tx_2$ and $Tx_3$ are transmitted in the form of electromagnetic waves, such as the electromagnetic waves 42-46 depicted in FIG. 1. These electromagnetic waves 42-46 are reflected off of one or more target object(s) 18 so that the reflected electromagnetic waves 52-58 are received at receive antenna array 30 in the form of receive signals $Rx_1$ to $Rx_4$. Each of the receive signals $Rx_1$ to $Rx_4$ is then mixed by frequency mixers 72-76 with the codes $C_1$ to $C_3$ to obtain decoded offset signals $D_{1,1}$ to $D_{M,N}$. In this example, because there are four receive signals $Rx_1$ to $Rx_4$, and each of these signals is mixed with three codes $C_1$ to $C_3$, the system generates a total of twelve decoded offset signals $D_1$ to $D_{M,N}$. For purposes of clarity, only one of the receive signals $Rx_1$ resulting in three decoded offset signals $D_{1,1}$ to $D_{1,3}$ is shown in FIG. 2, but it should be recognized that receive signals $Rx_2$ to $Rx_4$ would similarly result in decoded offset signals $D_{2,1}$ to $D_{M,N}$, even though they are not shown. The reason that these signals or waveforms are referred to as "decoded offset signals" is because even though codes $C_1$ to $C_3$ have been applied to the signals (i.e., they are decoded), there is still a Doppler frequency shift to correct; hence, the signals are "decoded," but are still "offset." Each decoded offset signal $D_{1,1}$ to $D_{M,N}$ is then passed to a frequency shift scoring component. For example, if there are twelve decoded offset signals $D_{1,1}$ to $D_{M,N}$, then each of these signals is provided to one of twelve frequency shift scoring components. For purposes of clarity, only three frequency shift scoring components 82 to 86 are shown in FIG. 2, and only a single frequency shift scoring component 84 is shown in detail. It should be appreciated, however, that the other frequency shift scoring components not shown in detail here may be the same as component 84.

Each of the decoded offset signals $D_{1,1}$ to $D_{M,N}$ is then provided to a frequency shift scoring component, where it is mixed with L frequency shift hypotheses to obtain a number of decoded hypothesis signals that will be subsequently evaluated and scored. At this point, the actual Doppler frequency shift is unknown and each frequency shift hypothesis represents an educated guess or estimate of the correct frequency shift correction; thus, the best estimate of the frequency shift correction will not be known until all of the estimates have been scored, as explained below in more detail. According to one example, each frequency shift hypothesis is mixed or applied in the Euler form, with $\omega_1$ through $\omega_L$ representing an angular frequency ($\omega_1=2\pi f_1$, where $f_1$ is a first estimated frequency shift to be applied). After applying L number of frequency shift hypotheses to a decoded offset signal $D_{1,2}$, L number of decoded hypothesis signals $F_{2,1}$ to $F_{2,L}$ are obtained for that particular decoded offset signal $D_{1,2}$. Thus, if there are M number of receive antennas, N number of codes (or transmit antennas), and L number of frequency shift hypotheses, then the vehicle radar system 10 will produce M×N×L number of decoded hypothesis signals $F_{1,1,1}$ through $F_{M,N,L}$. In the example illustrated in FIG. 2, assuming that there are five frequency shift hypotheses, the system will generate 4×3×5=60 separate decoded hypothesis signals F.

The decoded hypothesis signals $F_{1,1,1}$ to $F_{M,N,L}$ are then processed, calculated and/or otherwise evaluated in order to obtain a score, which can include and/or be based on a correlation value. Doppler frequency shifts may distort the orthogonality and/or other characteristics of the codes. Accordingly, the correlation value may quantitatively represent the correlation or relationship between the codes that were originally part of the encoded transmit signals $Tx_1$-$Tx_N$ (i.e., before they were distorted by a Doppler frequency shift) and the codes that are part of the decoded hypothesis signals $F_{1,1,1}$ to $F_{M,N,L}$ (i.e., after they were distorted by a Doppler frequency shift and then corrected). The frequency shift hypothesis associated with the highest score is selected as the best estimate of the actual Doppler frequency shift and may then be used in calculating the velocity and/or other parameters of the target object 18. Although the present description is provided in the context of the exemplary vehicle radar system 10 shown in FIGS. 1 and 2, which includes three transmit antennas 22-26 (and, thus, three codes $C_1$-$C_3$), four receive antennas 32-38, and five frequency shift hypotheses resulting in sixty decoded hypothesis signals $F_{1,1,1}$-$F_{M,N,L}$, this embodiment is only provided for purposes of illustration and the present system and method are in no way limited to this particular implementation.

FIG. 3 illustrates a flow chart depicting an exemplary method 200 of using a vehicle radar system to correct for a Doppler frequency shift and to obtain more accurate information regarding one or more target objects. According to one example, method 200 generates a number of estimates for a Doppler frequency shift and, after evaluating and scoring those estimates, the method uses the best estimate to correct for the Doppler frequency shift. Once corrected, the method is able to improve its radar measurements for various target object parameters, such as target object position, velocity, acceleration, etc., relative to the host vehicle. It should be understood that it is not necessary for the steps in method 200 to be performed in the particular order or sequence shown and described, and that performance of some or all the steps in an alternative order is certainly possible. In one non-limiting example, all or some of the steps in method 200 are performed by the vehicle radar system 10 as a standalone system or as part of a larger vehicle system.

The method 200 may begin at step 210, where a modulated signal $MS_1$ is obtained. In one embodiment, the waveform generator 28 of the transmitter 12 is used to generate a modulated signal $MS_1$ in the form of a baseband signal that is centered around a carrier frequency. The modulated signal $MS_1$ may have a bandwidth corresponding to linear frequency modulation (LFM) chirps or pulses, for example. The modulated signal $MS_1$ can be any appropriate or suitable modulated signal or waveform that can be used with the vehicle radar system 10 discussed herein, including modulated signals having a center frequency that is between 10 and 100 GHz. In one embodiment where the vehicle radar system 10 is mounted on a vehicle, the waveform generator 28 may produce a modulated signal $MS_1$ with a center frequency of approximately 77 to 81 GHz. Once a modulated signal $MS_1$ is generated and obtained, the method continues to step 220.

In step 220, the method mixes the modulated signal $MS_1$ with a code sequence ($C_1$-$C_N$) to produce a number of encoded transmit signals $Tx_1$-$Tx_N$, where the code sequence includes at least one separate code for each of the transmit antennas in the transmit antenna array 20. Typically, the number of codes in the code sequence ($C_1$-$C_N$) is equal to the number of transmit antennas in the transmit antenna array 20 (e.g., in FIG. 2, N=3 such that there are three codes ($C_1$-$C_3$) and three transmit antennas 22-26). As used herein, the terms "mix," "de-mix," "mixes," "de-mixes," "mixing," "de-mixing," "mixer," "de-mixer" and its other forms broadly include any suitable signal processing techniques that mix, de-mix, modulate, demodulate, encode, decode, multiply and/or otherwise apply or extract a code or codeword to or from a modulated signal or waveform. In one example, step 220 uses frequency mixers 62-66 to mathematically multiply the initial modulated signal $MS_1$ with three separate codes ($C_1$ to $C_3$) to obtain output signals in the form of encoded transmit signals $T_{x1}$-$T_{x3}$. The codes in step 220 may be orthogonal codes that can be used to separate transmission channels among the different transmit antennas so that the signals received at receiver 14 can be correspondingly separated. Such an encoding technique is oftentimes useful since, when multiple signals are transmitted at the same time in the same frequency range, the sum of all of these transmissions is received at the receiver 14. By mixing the transmitted signals with different codes (e.g., orthogonal codes), the sum or combination of the received signals can then be de-mixed at the receiver 14 so that the separately transmitted signals can be separated or parsed out. As used herein, the terms "orthogonal," "orthogonality," and its other forms broadly include any group or sequence of two or more codes that when the plurality of orthogonal codes are multiplied together, bit-wise, over a period of time and the products of this bit-wise multiplication are added together, the sum equals zero. For more information regarding the orthogonality of such codes, please refer to http://www.telecomnhall.com/what-does-orthogonal-means-in-wireless-networks.aspx. In one embodiment, Gold codes (or Gold sequences) can be used in step 220 for mixing the modulated signal $MS_1$. Other codes can be used, such as Hadamard codes and Kasami codes, as well as other codes or code sequences that, when applied to the modulated signal $MS_1$, minimal cross-channel interference between the transmitted signals occurs. A non-limiting example of a pair of orthogonal codes (i.e., an orthogonal code sequence) includes a first code {1,1,1,1} and a second code {1,−1,1,−1}, where bit-wise multiplication of the first and second code results in the products {1,−1,1,−1} which, when added, results in a sum of 0. Any other or additional codes used in the code sequence may similarly be orthogonal.

As mentioned above, the exemplary vehicle radar system 10 includes a transmit antenna array 20 having three transmitting antennas 22-26 (N=3) and, accordingly, a code sequence with three codes may be used ($C_1$, $C_2$, $C_3$), one for each transmit antenna. The first code $C_1$ can then be mixed with the modulated signal $MS_1$ to obtain a first encoded transmit signal $Tx_1$. Similarly, the second code $C_2$ can be mixed with the modulated signal $MS_1$ to obtain a second encoded transmit signal $Tx_2$, and the third code $C_3$ can be mixed with the modulated signal $MS_1$ to obtain a third encoded transmit signal $Tx_3$. According to a non-limiting example, the encoded transmit signal $Tx_n$ includes a plurality (or sequence) of chirps (or pulses) that can be represented by:

$$x^n(t) = \sum_{k=0}^{K-1} b_k^n \sin(2\pi f_c(t-kT) + \alpha(t-kT)^2)$$ (Equation 1)

where $x^n(t)$ represents the n-th encoded transmit signal $Tx_n$ from the n-th transmitting antenna, where t∈[0:T], $b_k^n$ is the k-the symbol of the code $C_n$, $f_c$ is the carrier frequency, n is the transmitter index, and k is the index of the symbol within the code sequence $C_n$. It should be appreciated that mixing and/or modulating techniques, other than those described above, may be used to generate encoded transmit signals $Tx_1$ to $Tx_N$. The method may then continue to step 230.

In step 230, the encoded transmit signals $Tx_1$ to $Tx_N$ are transmitted using the transmit antenna array 20 having N number of transmit antennas. For example, when carrying out the method with the vehicle radar system 10 (where N=3), three encoded transmit signals $Tx_1$, $Tx_2$, $Tx_3$ are transmitted, with the first transmit antenna 22 transmitting signal $Tx_1$, the second transmit antenna 24 transmitting signal $Tx_2$, and the third transmit antenna 26 transmitting signal $Tx_3$. FIG. 1 illustrates three electromagnetic signals 42-46 that are transmitted by antennas 22-26. In one embodiment, the encoded transmit signals $Tx_1$ to $Tx_N$ are transmitted or sent at the same time over the same frequency band. The encoded transmit signals $Tx_1$ to $Tx_N$ can be sent using techniques appreciated by those skilled in the art such as, for example, binary phase modulation (BPM), code division multiplexing (CDM), code division multiple access (CDMA), time division multiple access (TDMA), as well as any other suitable technique. Next, the method proceeds to step 240.

In step 240, a plurality of receive signals $Rx_1$-$Rx_M$ are received at the receive antenna array 30 and they include at least one receive signal for each receive antenna in the receive antenna array. Put differently, the encoded transmit signals $Tx_1$ to $Tx_N$ reflect off the target object 18 and are received or detected at each of the M number of receive antennas in the form of receive signals $Rx_1$-$Rx_M$. The receive signals $Rx_1$-$Rx_M$ may represent data that is sampled from the electromagnetic waves 52-58 that reflect off the target object 18 in the radar system field-of-view. For example, reflected electromagnetic waves 52-58 arrive at the receive antennas 32-38 and can then be sampled at a sampling frequency $F_s$ and processed according to known techniques to obtain the receive signals Rx to $Rx_M$. According to a non-limiting example, the hardware and/or software used to perform such steps and to process the receive signals $Rx_1$ to $Rx_M$ is part of the receiver 14.

In one embodiment, assuming a single reflection point, the received signals can be represented by:

$$y^m(t) = \sum_{n=0}^{N-1} h_n x^n(t-\tau)$$ (Equation 2)

where $y^m(t)$ represents the received signal at the m-th receiver, $h_n$ is the complex channel coefficient between the m-th receiver and the n-th transmitter, $x^n(t)$ represents the n-th transmission signal $Tx_n$ from the n-th transmitter, and r is the propagation delay of the signal. In one embodiment, the complex channel coefficient $h_n$ can be a function of the following: the distance between the transmitter and the target (or the reflection point); the distance between the receiver and the target (or the reflection point); the transmit antenna's and the receiving antenna's amplitude and phase response as a function of angle. The method 200 continues to step 250.

In step 250, each of the receive signals $Rx_1$ to $Rx_M$ is de-mixed (or mixed) with codes $C_1$ to $C_N$ to obtain decoded offset signals $D_{1,1}$ to $D_{M,N}$. Even though steps 250 through 280 are carried out for each of the receive signals $Rx_1$ to $Rx_M$, the discussion is limited to a single receive antenna 32 and a single corresponding receive signals $Rx_1$ for purposes of brevity. It should be appreciated that the steps and techniques described in the following paragraphs apply equally to the other receive signals $Rx_2$ to $Rx_M$ as well. According to the embodiment shown in FIG. 2, the receive signal $Rx_1$ is inputted to and de-mixed by frequency mixers 72-76 with the same code sequence $C_1$ to $C_3$ previously used in step 220; this results in decoded offset signals $D_1$ to $D_3$. In this example, because three codes $C_1$ to $C_3$ are applied to receive signal $Rx_1$, three separate decoded offset signals $D_1$ to $D_3$ are produced that correspond to receiving antenna 32; the same would occur for the other three receiving antennas 34-38 such that a total of twelve decoded offset signals are produced in steps 252-254. As mentioned above, the reason that these signals or waveforms are referred to as "decoded offset signals" is because even though codes $C_1$ to $C_3$ have been applied to the signals (i.e., they are decoded), there is still a Doppler frequency shift to correct; hence, the signals are "decoded," but are still "offset." Various filtering and/or other signal processing techniques can be carried out on the receive signals $Rx_1$ to $Rx_M$ and/or the decoded offset signals $D_{1,1}$ to $D_{M,N}$. Step 252 illustrates de-mixing the receive signal $Rx_1$ with code $C_1$ to obtain a first decoded offset signal $D_1$. Similarly, step 254 illustrates de-mixing the receive signal $Rx_1$ with code $C_N$ to obtain an n-th decoded offset signal $D_{1,N}$. In one embodiment, the decoded offset signals $D_{1,1}$ to $D_{M,N}$ represent the observed carrier signal. Each decoded offset signal $D_{1,1}$ to $D_{M,N}$ is then passed to a frequency shift scoring component. For example, if there are twelve decoded offset signals $D_{1,1}$ to $D_{M,N}$ (where M=4 and N=3), then each of these signals is provided to one of twelve frequency shift scoring components. The method 200 may then continue to step 260.

In step 260, a series of frequency shift hypotheses or estimations $\omega_1$ to $\omega_L$ are applied to each of the decoded offset signals $D_{1,1}$ to $D_{M,N}$ for each of the receive signals $Rx_1$ to $Rx_M$ to produce a number of decoded hypothesis signals $F_{1,1,1}$ through $F_{M,N,L}$. The number of frequency shift hypotheses can be represented by L. To illustrate, if there are M number of receive antennas (e.g., four receive antennas 32-38), N number of codes (e.g., three codes $C_1$-$C_3$), and L number of frequency shift hypotheses (e.g., five estimations), then the vehicle radar system 10 will produce M×N×L number of decoded hypothesis signals $F_{1,1,1}$ through $F_{M,N,L}$ (sixty hypothesis signals). The frequency shift hypotheses $\omega_1$ to $\omega_L$ may depend on the relative velocity between the target object and the vehicle radar system 10, such that $\omega=2\times\pi\times f_d$, and $f_d=2\times(f_c/c)\times v$, where $f_d$ is the Doppler frequency used for generating the frequency shift hypotheses $\omega_1$ to $\omega_L$, $f_c$ is the carrier frequency, c is the speed of light, and v is the relative velocity between the target object and the host vehicle or vehicle radar system 10. The frequency shift hypotheses $\omega_1$ to $\omega_L$ act as a series of educated guesses or estimates of the actual Doppler frequency shift and may be pre-determined and stored in memory (e.g., stored in receiver 14 or some other part of the vehicle radar system 10). According to a non-limiting example, frequency shift hypotheses $\omega_1$ to $\omega_L$ can include frequency shifts in the range of −30 KHz to 30 KHz. In other embodiments, the frequency shift hypotheses $\omega_1$ to $\omega_L$ are not pre-determined, but rather are calculated estimates based on current operating parameters or factors (e.g., based on a relative velocity between the host vehicle and the target object). For instance, the vehicle radar system 10 may obtain a last known relative velocity and then select a range of frequency shifts for hypotheses $\omega_1$ to $\omega_L$ that is based on the obtained relative velocity. The overall range of frequency shift values, the number L of frequency shift values, the spacing between frequency shift values, etc. can be predetermined or it can be altered or adjusted based on the degree of accuracy or precision that is needed. In general, the greater the number of frequency shift hypotheses L the higher the accuracy of the Doppler frequency shift estimate.

The frequency shift hypotheses $\omega_1$ to $\omega_L$ can be tested through using the Euler form $e^{j\omega_l t}$, where $\omega_l$ represents the l-th frequency shift hypothesis, t represents the time, and j is the imaginary number j. For each code n, each of the frequency shift hypotheses $\omega_1$ to $\omega_L$ are mixed with each of the decoded offset signals $D_{1,1}$ to $D_{M,N}$ to obtain a number of decoded hypothesis signals $F_{1,1,1}$-$F_{M,N,L}$. Thus, the number of decoded hypothesis signals is equal to N*L per receiving antenna. For example, step 262 depicts applying L frequency shift hypotheses to $D_{1,1}$ to obtain L decoded hypothesis signals $F_{1,1,1}$ to $F_{1,1,L}$ using frequency shift hypotheses $\omega_1$ to $\omega_L$. Similarly, step 264 depicts applying L frequency shift hypotheses to $D_{M,N}$ to obtain L decoded hypothesis signals $F_{M,N,1}$ to $F_{M,N,L}$ using frequency shift hypotheses $\omega_1$ to $\omega_L$. The method then continues to step 270.

In step 270, the method calculates or otherwise determines scores for the different frequency shift hypotheses $\omega_1$ to $\omega_L$, where each score generally represents the likelihood that a particular frequency shift hypothesis accurately estimates the actual Doppler frequency shift. According to one example, step 270 evaluates the decoded hypothesis signals $F_{1,1,1}$-$F_{M,N,L}$ by integrating an integrand that includes these signals and then summing and evaluating the results of these calculations (more information regarding formulas or equations that may be used to carry out these integrations are provided in the following paragraph). Starting with all of the decoded hypothesis signals $F_{1,1,1}$-$F_{1,N,L}$ that were initially received at the first receiving antenna 32 (in the present example where N=3 and L=5, there would be 15 such signals for the first receiving antenna), step 272 first integrates the decoded hypothesis signals $F_{1,1,1}$-$F_{1,N,1}$ that are associated with a first frequency shift hypothesis $\omega_1$ (in the present example, this would include signals $F_{1,1,1}$, $F_{1,2,1}$, $F_{1,3,1}$) and then accumulates or sums this sequence to determine a first output. Next, the step integrates the decoded hypothesis signals $F_{1,1,2}$-$F_{1,N,2}$ that are associated with a second frequency shift hypothesis $\omega_2$ (in the present example, this would include signals $F_{1,1,2}$, $F_{1,2,2}$, $F_{1,3,2}$) and then accumulates or sums this sequence to determine a second output. This process continues until step 274 integrates the decoded hypothesis signals $F_{1,1,5}$-$F_{1,N,5}$ associated with the last frequency shift hypothesis $\omega_5$ (in the present example, this would include signals $F_{1,1,5}$, $F_{1,2,5}$, $F_{1,3,5}$) and then accumulates or sums this sequence to determine a fifth output. Once all of the frequency shift hypotheses $\omega_1$ to $\omega_L$ have been evaluated for the signals received by the first receiving antenna 32, step 270 does the same for the decoded hypothesis signals $F_{2,1,1}$-$F_{2,N,L}$ that were initially received at the second receiving antenna 34. Accordingly, this process will result in L number of outputs for the first receiving antenna 32, L number of outputs for the second receiving antenna 34, L number of outputs for the third receiving antenna 36, and L number of outputs for the fourth receiving antenna 38; these outputs are sometimes referred to as accumulated results, where each output is a complex value. The absolute value of each output may be used as a score for that particular frequency shift hypothesis. Thus, each frequency shift hypotheses $\omega_1$ to $\omega_L$ has M number of scores, one for each receiving antenna in the receive antenna array 30.

According to a non-limiting example, step 270 may use Equation 3 to calculate scores or correlation values c for the frequency shift hypotheses $\omega_1$ to $\omega_L$, as discussed above. In one embodiment, the correlation value $c_{n,l}$ is determined based on the correlation or relationship between the originally transmitted signal (i.e., the encoded transmit signal Tx, which can be represented by $x^n(t)$) and the received signal (i.e., the receive signal Rx, which can be represented by $y^m(t)$), as corrected with a frequency shift hypothesis. And, in a particular embodiment, the correlation value $c_{n,l}$ can be determined through use of the following equation:

$$c_{n,l} = \int_{t=0}^{T} y^m(t) x^n(t) e^{j\omega_l t} \quad \text{(Equation 3)}$$

where $c_{n,l}$ is the correlation value for the n-th transmitted code and for the l-th frequency shift hypothesis ($\omega_l$), $\omega_l$ is the l-th frequency hypothesis, $y^m(t)$ represents the received signal at the m-th receiver, $x^n(t)$ represents the n-th encoded transmit signal from the n-th transmitting antenna, t is the time, and T is the time of the entire code sequence. Also, the correlation value $c_{n,l}$ can represent the decoded, frequency shifted signal that was transmitted from a particular transmitter n, that was encoded with the code $C_n$, and that was then separated using the code $C_n$ after it was received by the receiving antenna. As mentioned above, the absolute value of each correlation value may be summed with other correlation values for that frequency shift hypothesis and, thus, this overall summed value can be used as a score for that particular frequency shift hypothesis. In other embodiments, a score is obtained for each correlation value $c_{n,l}$, which can be the absolute value of the correlation value $c_{n,l}$. The method 200 continues to step 280.

In step 280, the frequency shift associated with the highest or maximal correlation score or value is selected. For example, a correlation value $c_{1,1}$ may be calculated based on a first frequency shift hypothesis $\omega_1$ for the first receiving antenna and may be the highest correlation value of all of the other calculated correlation values $c_{1,1}$ to $C_{N,L}$. In such a case, the frequency shift hypothesis $\omega_1$ is selected and then used to calculate the velocity of the target object 18 (step 290). In another embodiment, the frequency shift hypotheses can be attributed a weighted value based on the correlation values $c_{1,1}$ to $C_{N,L}$ for each particular frequency shift hypothesis that was used to obtain that particular correlation value. For example, the correlation values $c_{n,1}$ correspond to the first frequency shift hypothesis $\omega_1$ and, thus, the values $c_{n,1}$ (where n can be 1 to N) can be summed to obtain an overall score for the first frequency shift hypothesis $\omega_1$. The same can be done for the other 4 frequency shift hypotheses to obtain overall scores for each of them. Then, the frequency shift hypothesis $\omega_l$ with the largest score can be selected. Furthermore, the correlation values from Equation 3 that correspond to the best score may be used to estimate any number of other target object parameters, such as the target angle (by, for, example beamforming methods), and also possibly for estimation of the target range.

In another embodiment, steps 260 through 280 can be carried out to narrow down the range of potential values for the frequency shift caused by the reflection of the transmitted signals off of the moving target 18. Once a narrowed range of potential frequency shifts has been determined, steps 260 through 280 can be carried out again, but with using potential frequency shift values $\omega_l$ within the narrowed down range. For example, in the first iteration of steps 260 through 280, L could be set to 5 and in a second iteration L could be set to 10. As a result of the first iteration, a first frequency shift hypothesis can be selected based on the highest correlation score. Thereafter, in the second iteration, the series of frequency shift hypotheses $\omega_1$ to $C_L$ can include smaller differences or frequency intervals and can be set to values around the frequency shift hypothesis selected as a result of the first iteration. In this way, higher accuracy can be achieved with less computational steps. The method 200 continues to step 290.

In step 290, a target object parameter, such as a velocity of the target object, can be calculated based on the selected frequency shift hypothesis. To obtain the target object parameter, the selected frequency shift hypothesis can be used to recover the orthogonality between the transmitted signals so that separated transmit-receive signal pairs can be obtained and used to form a beamforming image, which can be used to obtain the target object parameter(s). As mentioned above, the Doppler frequency shift causes the orthogonality of the encoded transmit signals $Tx_1$ to $Tx_N$ to be lost (or distorted). Thus, by selecting the frequency shift hypothesis with the highest or best correlation score, the actual Doppler frequency shift can be estimated or approximated. And, by applying the selected frequency shift hypothesis to the received signals (along with de-mixing using the codes), the orthogonality between the encoded transmit signals can be restored at the receiver side. Since the orthogonality between the encoded transmit signals is restored (or at least improved), the receive signals can be shifted using the selected frequency shift and then decoded using the codes to obtain separated transmit-receive signal pairs. In one embodiment, since these resulting separated transmit-receive signal pairs may have already been obtained through the Doppler frequency shift estimation process, these values can be recalled from memory (assuming they were previously stored in memory); in other embodiments, applying the selected frequency shift hypothesis and the de-mixing step can be carried out after the frequency shift hypothesis is selected. The separated transmit-receive signal pairs can then be used to provide a high-resolution beamforming image, which can result in accurate estimates of the target object parameters, such as velocity, target range, and target angle (or angle of arrival).

The velocity can be the velocity of the target object 18 relative to the vehicle radar system 10. In one embodiment, the vehicle radar system 10 is included in a host vehicle 100 (FIG. 1) and, through using various vehicle sensors, a host vehicle velocity can be determined. The absolute velocity of the target object 18 (or the velocity relative to the earth) can be determined based on the relative velocity of the vehicle 100 and the target object 18, for example. Various Doppler frequency shift equations can be used to determine the velocity of the target object and that incorporate the selected frequency shift hypothesis, the frequency of the modulated signal (or encoded transmit signals), and/or the observed frequency of the received signals (in either their encoded or decoded forms), as well as various other information. For example, angle of arrival information, range, and/or other spatial information can be determined through processing received signals at the radar system 10. In one embodiment, MIMO angular resolution techniques can be used to determine the angle between the radar system 10 and the target object 18. For example, the target angle can be estimated by, for example, applying beamforming on the decoded symbols $c_{n,l}$ from all the transmit/receive combinations.

After the velocity of the target object is calculated, the velocity can be sent to other vehicle system modules (VSMs), such as ECU 120, onboard computer 130, and/or other VSMs 140. Additionally, angle and range information can be sent along with the velocity of the target object to other VSMs. This information can be used for various vehicle operations, such as providing notifications to a vehicle operator or passenger and/or carrying out various semi-autonomous or fully-autonomous vehicle functionality. The method 200 may end at this point or loop back for continued execution.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of using a vehicle radar system to estimate a Doppler frequency shift, the vehicle radar system comprises a transmitter, a receiver, a transmit antenna array having a plurality of transmitting antennas, and a receive antenna array having a plurality of receiving antennas, the method comprises the steps of:

receiving a modulated signal $MS_1$ from the transmitter;

mixing the modulated signal $MS_1$ with a code sequence $C_1$-$C_N$ using one or more frequency mixers of the transmitter to produce a plurality of encoded transmit signals $Tx_1$-$TX_N$, the code sequence $C_1$-$C_N$ includes at least one separate code for each of the plurality of transmitting antennas in the transmit antenna array;

transmitting the plurality of encoded transmit signals $Tx_1$-$Tx_N$ with the transmit antenna array;

receiving a plurality of receive signals $Rx_1$-$Rx_M$ with the receive antenna array, the plurality of receive signals $Rx_1$-$Rx_M$ include at least one encoded receive signal for each of the plurality of receiving antennas in the receive antenna array;

de-mixing the plurality of encoded receive signals $R_{x1}$-$R_{xM}$ with the code sequence $C_1$-$C_N$ using one or more frequency mixers of the receiver to produce a plurality of decoded offset signals $D_{1,1}$-$D_{M,N}$, the plurality of decoded offset signals $D_{1,1}$-$D_{M,N}$ include at least N number of decoded offset signals for each of the plurality of encoded receive signals $Rx_1$-$Rx_M$;

applying a plurality of frequency shift hypotheses $\omega_1$-$\omega_L$ to the plurality of decoded offset signals $D_{1,1}$-$D_{M,N}$ to obtain a plurality of decoded hypothesis signals $F_{1,1,1}$-$F_{M,N,L}$, the plurality of decoded hypothesis signals $F_{1,1,1}$-$F_{M,N,L}$ include at least L number of decoded hypothesis signals for each of the plurality of decoded offset signals $D_{1,1}$-$D_{M,N}$;

evaluating the plurality of decoded hypothesis signals $F_{1,1,1}$-$F_{M,N,L}$ to determine which frequency shift hypotheses $\omega_1$-$\omega_L$ most accurately represents the Doppler frequency shift; and selecting one of the plurality of frequency shift hypotheses $\omega_1$-$\omega_L$ to address the Doppler frequency shift, wherein the selection of a frequency shift hypothesis is based on the evaluation.

2. The method of claim 1, wherein each of the plurality of encoded transmit signals $T_{x1}$-$T_{xN}$ is provided to a separate transmitting antenna in the transmit antenna array.

3. The method of claim 1, wherein the code sequence $C_1$-$C_N$ includes a plurality of codes that are orthogonal, when the plurality of orthogonal codes are multiplied together, bit-wise, over a period of time and the products of this bit-wise multiplication are added together, the sum equals zero.

4. The method of claim 1, wherein the plurality of orthogonal codes includes a plurality of Gold codes.

5. The method of claim 1, wherein each of the plurality of decoded offset signals $D_{1,1}$ to $D_{M,N}$ is provided to a mixer in a frequency shift scoring component that applies a plurality of frequency shift hypotheses to the decoded offset signal.

6. The method of claim 1, wherein the plurality of frequency shift hypotheses $\omega_1$-$\omega_L$ are pre-determined estimates that are stored in memory in a receiver.

7. The method of claim 1, wherein the plurality of frequency shift hypotheses $\omega_1$-$\omega_L$ are calculated estimates that are gathered by a receiver and are based on current operating factors.

8. The method of claim 1, wherein the applying step further comprises applying the plurality of frequency shift hypotheses $\omega_1$-$\omega_L$ to the plurality of decoded offset signals $D_{1,1}$-$D_{M,N}$ using a Euler form $e^{j\omega_l t}$, where $\omega_l$ represents the l-th frequency shift hypothesis, t represents the time, and j is the imaginary number j.

9. The method of claim 1, wherein the evaluating step further comprises evaluating the plurality of decoded hypothesis signals $F_{1,1,1}$-$F_{M,N,L}$ by calculating a score for each of the plurality of frequency shift hypotheses $\omega_1$-$\omega_L$, where each score represents a likelihood that a particular frequency shift hypothesis accurately estimates the Doppler frequency shift.

10. The method of claim 9, wherein calculating the score further comprises integrating an integrand that includes the decoded hypothesis signals $F_{1,1,1}$-$F_{M,N,L}$ associated with a particular receiving antenna and a particular frequency shift hypothesis, and summing the integrated signals to obtain a score with a complex value.

11. The method of claim 10, wherein integrating the decoded hypothesis signals $F_{1,1,1}$-$F_{M,N,L}$ further comprises using the following equation:

$$c_{n,l} = \int_{t=0}^{T} y^m(t) x^n(t) e^{j\omega_l t}$$

where $c_{n,l}$ is the correlation value for the n-th transmitted code and for the l-th frequency shift hypothesis ($\omega_l$), $\omega_l$ is the frequency hypothesis, $y^m(t)$ represents the received signal at the m-th receiving antenna, $x^n(t)$ represents the n-th encoded transmit signal from the n-th transmitting antenna, t is the time, and T is the time of the entire code sequence.

12. The method of claim 10, wherein calculating the score further comprises obtaining an absolute value from the score with the complex value, and assigning the absolute value as the score.

13. The method of claim 1, wherein the selecting step further comprises selecting one of the plurality of frequency shift hypotheses $\omega_1$-$\omega_L$ based on a correlation between one or more of the plurality of encoded transmit signals $Tx_1$-$Tx_N$ and one or more of the plurality of receive signals $Rx_1$-$Rx_M$, as corrected by the selected frequency shift hypothesis.

14. The method of claim 1, further comprising the step of:
calculating a velocity of a target object, wherein the target object velocity calculation uses the selected frequency shift hypothesis to correct for the Doppler frequency shift.

15. The method of claim 1, further comprising the step of:
providing target object parameters to a vehicle system module (VSM) that carries out autonomous or semi-autonomous vehicle functions, wherein the target object parameters have been the modified with the selected frequency shift hypothesis to correct for the Doppler frequency shift.

16. The method of claim 1, wherein the vehicle radar system is a multiple input multiple output (MIMO) radar system that is directed towards an area in front of the vehicle and comprises a transmitter, a transmit antenna array having three or more transmitting antennas, a receive antenna array having three or more receiving antennas and a receiver.

17. The method of claim 1, further comprising the step of:
obtaining a beamforming image based on separated transmit-receive signal pairs, wherein each of the separated transmit-receive signal pairs are obtained based on the selected frequency shift hypothesis.

18. The method of claim 17, wherein the receive signals $Rx_1$ to $Rx_M$ are shifted by the selected frequency shift hypothesis and separated through de-mixing the receive signals $Rx_1$ to $Rx_M$ with the codes $C_1$ to $C_N$ to obtain the separated transmit-receive signal pairs.

19. The method of claim 18, further comprising the step of:

calculating a target object parameter based on the beamforming image.

20. A vehicle radar system for addressing a Doppler frequency shift, the vehicle radar system is mounted on a host vehicle and comprises:
- a transmitter with one or more frequency mixers, the transmitter is configured to provide a plurality of encoded transmit signals $Tx_1$-$Tx_N$ that include a modulated signal $MS_1$ mixed with a code sequence $C_1$-$C_N$, wherein the one or more frequency mixers of the transmitter are configured to mix the modulated signal $MS_1$ with the code sequence $C_1$-$C_N$ to produce the plurality of encoded transmit signals $Tx_1$-$Tx_N$;
- a transmit antenna array with a plurality of transmitting antennas coupled to the transmitter, the transmit antenna array is configured to receive the plurality of encoded transmit signals $Tx_1$-$Tx_N$ from the transmitter such that the code sequence $C_1$-$C_N$ includes at least one separate code for each of the plurality of transmitting antennas;
- a receive antenna array with a plurality of receiving antennas, the receive antenna array is configured to provide a plurality of receive signals $Rx_1$-$Rx_M$; and
- a receiver with one or more frequency mixers coupled to the receive antenna array, wherein the receiver is configured to:
  - de-mix the plurality of receive signals $Rx_1$-$Rx_M$ with the code sequence $C_1$-$C_N$ using the one or more frequency mixers of the receiver to produce a plurality of decoded offset signals $D_{1,1}$-$D_{M,N}$, the plurality of decoded offset signals $D_{1,1}$-$D_{M,N}$ include at least N number of decoded offset signals for each of the plurality of receive signals $Rx_1$-$Rx_M$;
  - apply a plurality of frequency shift hypotheses $\omega_1$-$\omega_L$ to the plurality of decoded offset signals $D_{1,1}$-$D_{M,N}$ to obtain a plurality of decoded hypothesis signals $F_{1,1,1}$-$F_{M,N,L}$, the plurality of decoded hypothesis signals $F_{1,1,1}$-$F_{M,N,L}$ include at least L number of decoded hypothesis signals for each of the plurality of decoded offset signals $D_{1,1}$-$D_{M,N}$;
  - evaluate the plurality of decoded hypothesis signals $F_{1,1,1}$-$F_{M,N,L}$ to determine which frequency shift hypotheses $\omega_1$-$\omega_L$ most accurately represents the Doppler frequency shift; and
  - select one of the plurality of frequency shift hypotheses $\omega_1$-$\omega_L$ to address the Doppler frequency shift, wherein the selection of a frequency shift hypothesis is based on the evaluation.

* * * * *